Figure 1:
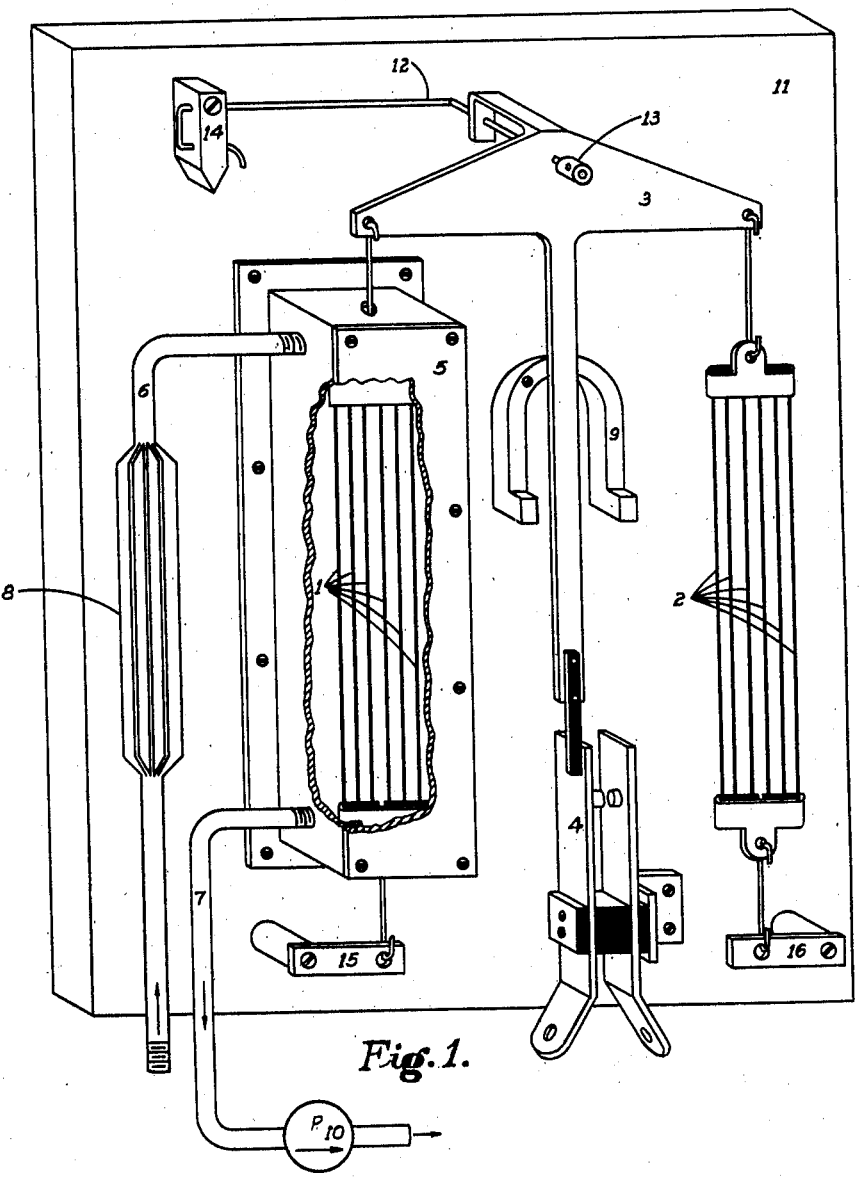

March 21, 1944.                J. D. ASKEW                2,344,530

HUMIDITY CONTROLLER

Filed Aug. 10, 1942

John D. Askew
INVENTOR

Patented Mar. 21, 1944

2,344,530

UNITED STATES PATENT OFFICE 2,344,530

HUMIDITY CONTROLLER

John D. Askew, Atlanta, Ga.

Application August 10, 1942, Serial No. 454,254

15 Claims. (Cl. 236—44)

This invention relates to automatic control instruments, such as are used in the air conditioning art, and in various other fields of application.

My invention is an improvement in humidity actuated automatic controls. Such instruments are not new, and are commonly known to the trade as "humidostats," or "hygrostats." In their usual form, such instruments generally consist of a member which possesses the property of changing its mechanical shape or size proportionately to the relative humidity of the atmosphere surrounding it, and a pair of electrical contacts or an electrical rheostat mechanically linked thereto in such manner that an electrical circuit is automatically made to vary in accordance with the relative humidity of the atmosphere surrounding the instrument. The member which possesses the property of changing its shape or size usually consists of a number of parallel strands of chemically treated hair, held under tension. However, a number of other materials have been successfully employed for this purpose, including wood, paper, gut, and rawhide.

Specifically, my invention is a new and special type of humidostat, designed to control the operation of a fan or other external device in response to the difference between the respective absolute humidities of two different atmospheres, which exist at two different locations. Such an instrument can best be described as a "differential humidostat," or "differential humidity controller."

The uses to which such an instrument can be put are numerous. The most important field of application which I foresee for it at present will be to automatically control the operation of a ventilating fan or blower in order to prevent dampness in a basement, storage room, or other enclosure with contents which are susceptible to damage from moisture. For such an application, the differential humidostat would ordinarily be arranged to compare the absolute humidity inside of the basement with the absolute humidity out-of-doors, and would thus serve to automatically start the ventilating fan whenever the absolute humidity inside of the basement exceeds that out-of-doors by a predetermined amount. The operation of the fan conveys air into the enclosure from out-of-doors, and thus reduces the absolute humidity therein. When the absolute humidity within the enclosure has been thus decreased to the same value as out-of-doors, the differential humidostat then automatically stops the fan.

It will be evident that in a room or other enclosure equipped with this particular type of humidity control system, the absolute atmospheric humidity will at no time be substantially greater than that out-of-doors. If the fan, exhaust louvers, and other wall openings are equipped with shutters or similar devices to seal these openings during periods when the fan is idle, and if substantial quantities of water are not continuously evaporated within the enclosure, the absolute atmospheric humidity inside of the enclosure will gradually approach the lowest value which recurs periodically with reasonable frequency out-of-doors.

Figure 2:
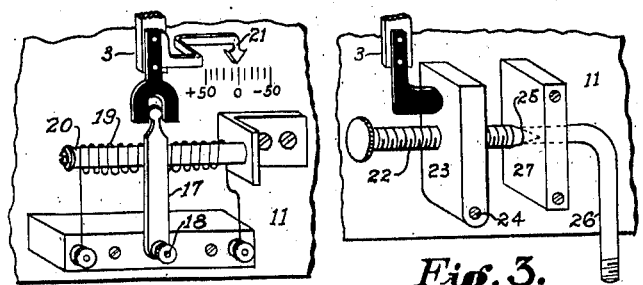
Figure 3:
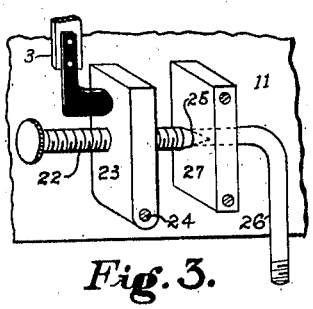

The accompanying drawing discloses the essential features of my invention in three of the forms in which it can be built. It should be understood that this drawing is not to scale. All details of mechanical structure shown thereon have been selected solely because of their simplicity and ease of interpretation. For example, it will be observed that various means for manual adjustment which are desirable for conveniently calibrating the instrument have been intentionally shown on the drawing in the simplest possible manner, and the instrument as actually manufactured may instead be equipped with other and more elaborate means of adjustment which are now in common use. Figure 1 of the drawing illustrates the device when equipped with electrical contacts, such as would be required for controlling a single-speed electric motor. Figure 2 illustrates a minor modification of Figure 1, utilizing an electrical potentiometer, such as would be required for controlling a variable-speed electric motor, a continuously variable air damper, or other potentiometer-controlled element. Figure 3 illustrates a second minor modification of Figure 1, utilizing a fluid control valve, such as would be required for controlling a pneumatically actuated motor, damper, or the like.

Referring to Figure 1 of the drawing, the instrument may consist of two substantially identical members 1 and 2, which possess the property of varying their lengths proportionately to the relative humidities of the respective atmospheres surrounding them, a suitable mechanical linkage 3, an electrical control element such as a pair of electrical contacts 4, which will thus be automatically adjusted or varied in accordance with the difference between the relative humidity of the atmosphere surrounding member 1 and that of the atmosphere surrounding member 2; a substantially airtight chamber 5 enclosing member 1, with air inlet and exhaust pipes 6 and 7 respectively; and a suitable heat radiating or heat exchanging surface 8 for bringing the atmosphere surrounding member 1 within chamber 5 to approximately the same temperature as the atmosphere surrounding member 2.

The electrical control element is indicated in Figure 1 of the drawing as consisting of a simple pair of electrical contacts. Instead of electrical contacts, I may elect to use one or more electrical potentiometers or fluid control valves without altering the principle of my invention. Figure 2 of the drawing illustrates the use of an electrical potentiometer. In Figure 2, the mechanical linkage 3 is so designed that it positions the electrical contact arm 17 of an electrical potentiometer, which is shown as rotating about a fixed pivot 18, and thus making a sliding contact on a coil of bare resistance wire 19, which is wound on a suitable bobbin of insulating material 20 secured to the base 11. The mechanical linkage 3 may be equipped with a suitable indicator 21 for indicating its position. Figure 3 of the drawing illustrates the use of a fluid control valve. In Figure 3, the mechanical linkage 3 is so designed that it positions an adjustable needle valve, and is shown as rotating the needle block 23 about a fixed pivot 24. The force exerted by linkage 3 thus varies the pressure exerted by the end of the needle 22 on an orifice 25 in the end of a pipe 26 which is secured to the base 11 by a block 27. It will be apparent that other types of valves may be actuated by linkage 3. The drawing includes only one pair of electrical contacts or one potentiometer or one fluid valve as a control element, but it will be evident that several such control elements could be provided and ganged together to operate in unison in a single humidostat, in order to control several remote devices in unison or in sequence.

The radiating or heat exchanging surface 8, by bringing both atmospheres to approximately the same temperature, serves to make the instrument capable of comparing absolute humidities or dew points instead of merely comparing relative humidities as would be the case if the atmosphere surrounding member 1 were at a materially different temperature from that surrounding member 2. If will be evident that if desired, this heat exchanging surface could be obtained by making chamber 5 and air inlet pipe 6 of such material, size, and design that the provision of a radiator as a separate unit would be unnecessary.

A magnet 9 may be employed to prevent contact chatter or unnecessary operation from small atmospheric changes of insufficient magnitude to justify operating the fan or other device controlled by the instrument. In event that I elect to employ a magnet for such purpose, it will be evident that the linkage 3 must either be made of magnetic material, or else provided with a suitable insert of magnetic material, so that it will be physically attracted by the poles of the magnet 9. There are, however, a number of other methods whereby unnecessary operation from small atmospheric changes may be prevented, such as by means of toggles or other mechanical devices or by means of electrical circuits well known to those versed in this art.

It will also be evident that this instrument requires for its operation a suitable means 10 for continuously or intermittently conveying a sample of atmosphere from the distant source through inlet pipe 6. This means may consist of a small fan, air pump, or blower as indicated on the drawing; or it may consist of some source of draft which is already available, such as an existing chimney or stack, which could be connected to exhaust pipe 7.

Certain minor mechanical details which are also shown on the drawing are: a base 11, a spring 12 to hold members 1 and 2 under tension, a collar 13 to hold linkage 3 in alignment, a manually adjustable block 14 to which spring 12 is firmly secured, and manually adjustable plates 15 and 16 by which members 1 and 2 are supported.

What I claim is:

1. In combination; two members each of which possesses the property of varying its physical characteristics as a function of the humidity of the gaseous medium surrounding it, a chamber enclosing one of the members, inlet and exhaust conduits connected to the chamber, electrical contacts, coupling means for changing the spacing of the electrical contacts in accordance with the difference between the respective variations of physical characteristics of the two members, means for conveying a gaseous medium through the chamber, and means for bringing the temperature of the gaseous medium thus conveyed, prior to its exit from the chamber, to approximately the temperature of the gaseous medium surrounding the other member.

2. In combination; two members each of which possesses the property of varying a physical characteristic as a function of the humidity of the atmosphere surrounding it, a chamber enclosing one of the members, inlet and exhaust conduits connected to the chamber, a potentiometer, coupling means for controlling the adjustment of the potentiometer in accordance with the difference between the respective variations of said physical characteristic of the two members, means for conveying atmosphere through the chamber, and means for bringing the temperature of the atmosphere thus conveyed, prior to its exit from the chamber, to approximately the temperature of the atmosphere surrounding the other member.

3. In combination; two members each of which possesses the property of varying its physical characteristics as a function of the humidity of the gaseous medium surrounding it, a chamber enclosing one of the members, inlet and exhaust conduits connected to the chamber, an indicating device, coupling means for controlling the position of the indicating device in accordance with the difference between the respective variations of physical characteristics of the two members, means for conveying a gaseous medium through the chamber, and means for bringing the temperature of the gaseous medium thus conveyed, prior to its passage through the chamber, to approximately the temperature of the gaseous medium surrounding the other member.

4. In combination; two members which possess the property of varying their physical characteristics as a function of the humidity of the gaseous media surrounding them, a chamber enclosing one of the members, an inlet conduit connected to the chamber, an exit port connected to the chamber, a valve, coupling means for controlling the setting of the valve in accordance with the difference between the respective variations of physical characteristics of the two members, means for conveying a gaseous medium through the chamber, and means for bringing the temperature of the conveyed gaseous medium, prior to its exit from the chamber, to approximately the temperature of the other member.

5. A control system, including two members made of a material which possesses the property of varying its length as a function of the humidity of the atmosphere surrounding it, an electrical control device, coupling means for actuating the electrical control device in accordance with the difference between the respective variations of length of the two members, means for conveying a gaseous medium from a distant source to one of the members, and means for bringing the temperature of the gaseous medium, prior to its contact with last said member, to approximately the temperature of the other member.

6. A differential humidity control including, in combination, a first humidity responsive device exposed to a first gas, a second humidity responsive device, means to subject said second humidity responsive device to a second gas, means to adjust the temperature of the second said humidity responsive device to substantially that of the first said gas and means interconnecting said two humidity responsive devices adapted to effect a control operation in response to a difference in the respective humidities of the two gases.

7. A device for controlling the operation of air conditioning equipment in response to the difference between the humidities of two separated atmospheres; consisting of a first humidity responsive element exposed to one of said atmospheres, a second humidity responsive element exposed to the other of said atmospheres, means for maintaining the temperature of the portion of the first atmosphere in the immediate vicinity of the first element at substantially the temperature of the second atmosphere, and a differential controller actuated by the humidity responsive elements.

8. A device for controlling the operation of ventilating equipment in response to the difference between the humidities of two separated atmospheres including, in combination, a first humidity responsive assembly exposed to one of said atmospheres, a second humidity responsive assembly in an enclosure, means for conveying a sample of the other of said atmospheres through said enclosure, means to bring the atmosphere conveyed through said enclosure to substantially the same temperature as the atmosphere to which the first humidity responsive assembly is exposed, a control element, and coupling means actuated jointly by said two humidity responsive assemblies for actuating said control element in response to a predetermined difference between the humidities of the respective atmospheres to which said assemblies are exposed.

9. A device for controlling the operation of ventilating equipment supplying air to an enclosure, comprising a chamber through which a sample of atmosphere is conveyed from a source external to the enclosure, a humidity responsive controller within the chamber, and a heat exchanging surface exposed to both the atmosphere within the enclosure and the sample, for changing the temperature of the sample of atmosphere, prior to its passage through the chamber, to substantially the temperature within the enclosure.

10. A device for controlling ventilating fans and their associated dampers for the purpose of ventilating an enclosure, comprising a humidity responsive controller exposed to an atmosphere external to the enclosure, and a heat exchanging surface exposed to both the atmosphere within the enclosure and the atmosphere external to the enclosure for changing the temperature of the portion of external atmosphere in contact with the humidity responsive controller to substantially the temperature within the enclosure.

11. The method of maintaining the humidity of the air of various temperatures in an enclosed room at an amount which on the average is less than the humidity of the air out-of-doors when measured at the temperature of the air within the room; which consists in sampling the air out-of-doors, bringing the sample to substantially the same temperature as that of the air within the room, measuring the humidity of the sample at said temperature, measuring the humidity of the air within the room, and pumping air from out-of-doors into the room whenever the humidity of the air in the room is greater than that of the measured sample.

12. The method of controlling the humidity of the atmosphere in an enclosure; which consists in sampling air outside of the enclosure, changing the temperature of the sample of air to substantially that within the enclosure, subsequently measuring the humidity of the air thus sampled, measuring the humidity of the atmosphere within the enclosure, and pumping air into the enclosure from outside the enclosure whenever the humidity of the sample measured at substantially the temperature within the enclosure is less than the humidity of the atmosphere within the enclosure.

13. The method of effecting control in response to the difference in the humidities of two separated atmospheres; which consists in measuring the humidity of one of the atmospheres, bringing a sample of the other atmosphere to substantially the same temperature as that of the first atmosphere, measuring the humidity of the sample at said temperature and effecting a control operation in response to a predetermined difference in the two humidity measurements.

14. For the purpose of maintaining the humidity of the atmosphere in an enclosure at an average value lower than that which can be secured solely by the uncontrolled admission of outside air, the method which consists in sampling the outside air, bringing the temperature of the sample of air to the temperature within the enclosure, measuring the humidity of the sample at said temperature, and pumping outside air into the enclosure whenever the humidity of the sample so measured is below a predetermined value.

15. The method of effecting humidity control of atmosphere within an enclosure which consists in obtaining a sample of atmosphere outside of the enclosure, bringing the temperature of the sample to substantially that of the atmosphere within the enclosure, measuring the humidity of the sample at said temperature, and controlling the humidity of the enclosed atmosphere in response to the humidity of the sample thus measured.

JOHN D. ASKEW.